(12) United States Patent
Concannon et al.

(10) Patent No.: US 11,341,503 B2
(45) Date of Patent: May 24, 2022

(54) DEPLOYING A CLOUD-BASED SYSTEM USING A DISTRIBUTED LEDGER

(71) Applicant: AMERICAN EXPRESS TRAVEL RELATED SERVICES COMPANY, INC., New York, NY (US)

(72) Inventors: Michael Concannon, New York, NY (US); Andras L. Ferenczi, Peoria, AZ (US); Mohammad N. Nauman, Peoria, AZ (US)

(73) Assignee: American Express Travel Related Services Company, Inc., New York, NY (US)

(*) Notice: Subject to any disclaimer, the term of this patent is extended or adjusted under 35 U.S.C. 154(b) by 337 days.

(21) Appl. No.: 16/442,814

(22) Filed: Jun. 17, 2019

(65) Prior Publication Data

US 2020/0394654 A1 Dec. 17, 2020

(51) Int. Cl.
*G06Q 20/40* (2012.01)
*G06Q 20/38* (2012.01)
*H04L 67/133* (2022.01)
*H04L 9/06* (2006.01)

(52) U.S. Cl.
CPC ......... *G06Q 20/405* (2013.01); *G06Q 20/388* (2013.01); *H04L 9/0637* (2013.01); *H04L 67/40* (2013.01)

(58) Field of Classification Search
None
See application file for complete search history.

(56) References Cited

U.S. PATENT DOCUMENTS

| | | | | |
|---|---|---|---|---|
| 2018/0117447 | A1* | 5/2018 | Tran | G16H 10/60 |
| 2019/0349426 | A1* | 11/2019 | Smith | H04W 4/08 |
| 2020/0052880 | A1* | 2/2020 | Bathen | H04L 9/0833 |
| 2020/0151350 | A1* | 5/2020 | Irazabal | H04L 9/0637 |

FOREIGN PATENT DOCUMENTS

KR 20200072318 A * 6/2020

* cited by examiner

*Primary Examiner* — Jamie R Kucab
(74) *Attorney, Agent, or Firm* — Thomas | Horstemeyer, LLP

(57) ABSTRACT

Systems and methods for the deployment of cloud-based systems using a distributed ledger are disclosed. The system may include a cloud provider system and a distributed ledger. The cloud provider system may be configured to deploy cloud-based systems and APIs to enable one or more participant systems to leverage cloud-based resources. The distributed ledger may record events, functionalities, and operations from the cloud provider system, the participant systems, and the deployed cloud-based systems and APIs.

20 Claims, 5 Drawing Sheets

DEPLOYING A CLOUD-BASED SYSTEM USING A DISTRIBUTED LEDGER

FIELD

The disclosure generally relates to cloud-based systems, and more specifically, to systems and methods for deploying a cloud-based system using a distributed ledger.

BACKGROUND

Distributed ledger systems provide a decentralized database that is consensually shared and synchronized without a central administrator or intermediate party. The decentralized database may exist across several locations and/or among multiple participants. The distributed ledger system may process, validate, and/or authenticate writes and data exchanges to the decentralized database. For example, in a blockchain implementation, the system may provide features and functionality including consensus-based validation, immutability, and cryptographically chained blocks of data.

A technical problem is that the decentralization (including implementing consensus-based validation, immutability, and/or cryptographically chained blocks) increases the use of resources in the distributed ledger system (and its participants), and decreases the performance and capabilities of the distributed ledger system (and its participants). Moreover, as the size of the decentralized database grows, the requirements for storage, bandwidth, and computing power required by participants in the distributed ledger system also increases.

SUMMARY

Systems, methods, and articles of manufacture (collectively, the "system") for deploying a cloud-based system using a distributed ledger are disclosed. The system may include a smart contract (e.g., a deployment smart contract) configured to perform various operations comprising: receiving a system coalition invocation from a first participant system, wherein the system coalition invocation comprises a first participant identifier associated with the first participant system and a software repository identifier; transmitting the software repository identifier to a cloud provider, wherein in response to receiving the software repository identifier the cloud provider retrieves a system software associated with the software repository identifier, and wherein in response to retrieving the system software the cloud provider executes the system software to deploy a cloud-based system to a cloud platform; and writing a system coalition to a distributed ledger, wherein the system coalition comprises the first participant identifier.

In various embodiments, the system coalition invocation may comprise a second participant identifier. The smart contract may also perform operations comprising: transmitting a pending coalition notification to a second participant system associated with the second participant identifier; receiving a pending coalition join request from the second participant system; and writing the pending coalition join request to the distributed ledger, wherein the software repository identifier is not transmitted to the cloud provider until the pending coalition join request is received, and wherein the system coalition comprises the second participant identifier. The smart contract may also perform operations comprising: receiving an API deployment request, wherein the API deployment request comprises an API repository identifier; transmitting the API repository identifier to the cloud provider, wherein in response to receiving the API repository identifier the cloud provider retrieves an API software associated with the API repository identifier, wherein in response to retrieving the API software the cloud provider executes the API software to deploy an API, and wherein the API provides the first participant system access to the cloud-based system in the cloud platform; and writing an API generation response to the distributed ledger, wherein the API generation response is received from the cloud provider in response to the API being deployed.

The API deployment request may comprise a third participant identifier. The smart contract may also perform operations comprising: transmitting a pending API deployment notification to a third participant system associated with the third participant identifier; receiving an API deployment approval from the third participant system; and writing the API deployment approval to the distributed ledger, wherein the API repository identifier is not transmitted to the cloud provider until the API deployment approval is received. The first participant system may invoke the API to transmit an API call to the cloud provider, wherein the API call comprises an API call functionality, and wherein in response to receiving the API call the cloud provider executes the API call functionality on the cloud-based system in the cloud platform. The smart contract may also perform operations comprising: receiving an API call event from the cloud provider, wherein the API call event is generated by the cloud provider in response to the cloud provider executing the API call functionality; and writing the API call event to the distributed ledger.

In various embodiments, a cloud provider system is disclosed. The cloud provider system may be configured to perform operations comprising: receiving a software repository identifier from a deployment smart contract on a distributed ledger, wherein the deployment smart contract transmits the software repository identifier in response to receiving a system coalition invocation from a first participant system, and wherein the system coalition invocation comprises a first participant identifier and the software repository identifier; retrieving a system software associated with the software repository identifier; executing the system software to deploy a cloud-based system to a cloud platform; and invoking, by the cloud provider system, the deployment smart contract to write a system coalition generation response on the distributed ledger.

In various embodiments, the cloud provider system may also perform operations comprising: deploying the deployment smart contract on the distributed ledger; and invoking the deployment smart contract to register a participant account for the first participant system, wherein in response to being invoked the deployment smart contract generates the first participant identifier and writes the participant account to the distributed ledger. The cloud provider system may also perform operations comprising receiving an API repository identifier from the deployment smart contract, wherein the deployment smart contract transmits the API repository identifier in response to receiving an API deployment request from the first participant system, and wherein the API deployment request comprises the first participant identifier and the API repository identifier; retrieving an API software associated with the API repository identifier; executing the API software to deploy an API, wherein the API provides the first participant system access to the cloud-based system in the cloud platform; and invoking the deployment smart contract to write an API generation response on the distributed ledger. The cloud provider system may also perform operations comprising receiving an API call from the API, wherein the API call comprises an API call functionality; executing the API call functionality on the cloud-based system; and transmitting an API call result to the deployment smart contract, wherein in response to receiving the API call result the deployment smart contract writes the API call result to the distributed ledger.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

Figure 1:
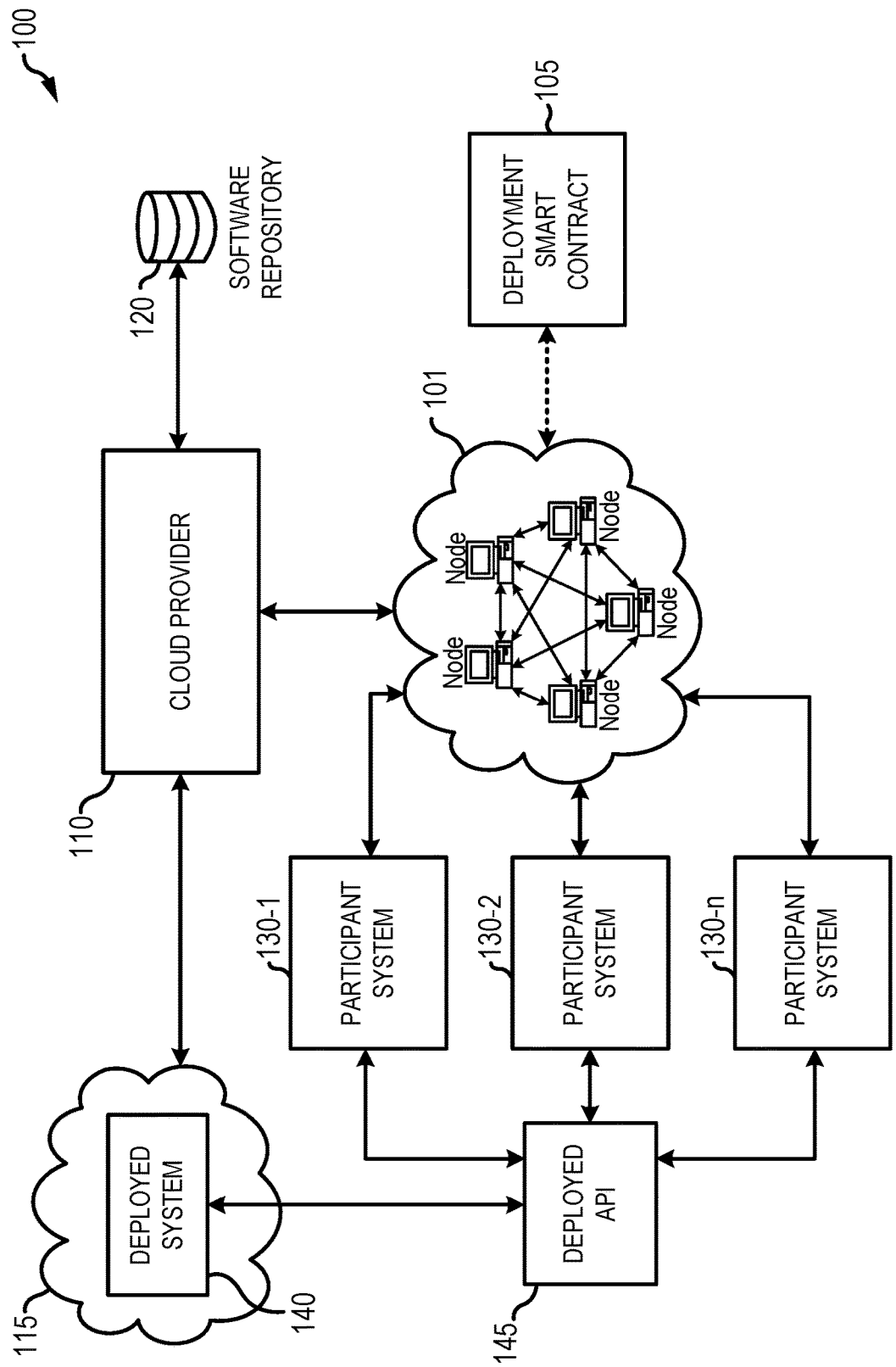
FIG. 1 is a block diagram illustrating various system components of a system for deploying a cloud-based system using a distributed ledger, in accordance with various embodiments.

Systems and methods for the deployment of cloud-based systems using a distributed ledger are disclosed. The system may provide a hybrid approach to deploying systems, wherein the deployed systems are maintained on a cloud platform, and actions and events of the deployed systems and/or the participants are written to a distributed ledger. For example, the system may enable the deployment of systems (e.g., software applications, databases, services, etc.) that are hosted by a plurality of participants. In various embodiments, the distributed ledger may be configured to establish a coalition of the plurality of participants, obtain consensus on the functionality of the system being deployed, and keep a record of auditing and accounting for running costs on infrastructure provided by the cloud provider and shared by one or more of the participants. The system may be deployed on a cloud platform to provide the benefits of cloud-based solutions such as, for example, low cost, performance, security, and/or scalability. Therefore, the system provides technical solutions to the technical problems caused in typical distributed ledger implementations.

In various embodiments, the system may be scaled to accommodate any desired number of cloud providers and participants. The system may enable participants to deploy any desired number of cloud-based systems. The system may enable a participant to join a plurality of system coalitions. Each system coalition may comprise any specified number of participants.

In various embodiments, the system may use a distributed ledger maintained by a plurality of computing devices (e.g., nodes) over a peer-to-peer network. Each computing device maintains a copy and/or partial copy of the distributed ledger and communicates with one or more other computing devices in the network to validate and/or write data to the distributed ledger. The distributed ledger may use features and functionality of blockchain technology including, for example, consensus-based validation, immutability, and cryptographically chained blocks of data. The blockchain may comprise a ledger of interconnected blocks containing data. The blockchain may provide enhanced security because each block may hold individual transactions and the results of any blockchain executables. Each block may link to the previous block and may include a timestamp. Blocks may be linked because each block may include the hash of the prior block in the blockchain. The linked blocks form a chain, with only one successor block allowed to link to one other predecessor block for a single chain. Forks may be possible where divergent chains are established from a previously uniform blockchain, though typically only one of the divergent chains will be maintained as the consensus chain. In various embodiments, the blockchain may implement smart contracts that enforce data workflows in a decentralized manner. The system may also include applications deployed on user devices such as, for example, computers, tablets, smartphones, Internet of Things devices ("IoT" devices), etc. The applications may communicate with the blockchain (e.g., directly or via a blockchain node) to transmit and retrieve data. In various embodiments, a governing organization or consortium may control access to data stored on the blockchain. Registration with the managing organization(s) may enable participation in the blockchain network.

Data transfers performed through the system may propagate to the connected peers within the blockchain network within a duration that may be determined by the block creation time of the specific distributed ledger technology implemented. For example, on an ETHEREUM®-based network, a new data entry may become available within about 13-20 seconds as of the writing. On a HYPERLEDGER® Fabric 1.0 based platform, the duration is driven by the specific consensus algorithm that is chosen, and may be performed within seconds. In that respect, propagation times and the speed of transferring data, initiating purchases, and completing purchases in the system may be improved compared to existing systems, and implementation costs and time to market may also be drastically reduced. The system also offers increased security at least partially due to the immutable nature of data that is stored in the blockchain, reducing the probability of tampering with various data inputs and outputs. Moreover, the system may also offer increased security of buying requests and purchases by performing cryptographic processes on data prior to storing the data on the blockchain. Therefore, by transmitting, storing, and accessing data using the system described herein, the security of the data is improved, which decreases the risk of the computer or network from being compromised.

In various embodiments, the system may also reduce database synchronization errors by providing a common data structure, thus at least partially improving the integrity of stored data. Further, by syncing data with the involved parties in real time (or near real time), the system may improve data integrity, data confidentiality, and data security, which may also improve the speed of the business process. The system also offers increased reliability and fault tolerance over traditional databases (e.g., relational databases, distributed databases, etc.) as each node may operate with a full copy of the stored data, thus at least partially reducing downtime due to localized network outages and hardware failures. The system may also increase the reliability of data transfers in a network environment having reliable and unreliable peers, as each node broadcasts messages to all connected peers, and as each block comprises a link to a previous block, a node may quickly detect a missing block and propagate a request for the missing block to the other nodes in the blockchain network.

In various embodiments, and with reference to FIG. 1, a system 100 for deploying cloud-based systems using blockchain is disclosed. System 100 may include various computing devices, software modules, networks, and data structures in communication with one another. For example, system 100 may comprise one or more of a distributed ledger 101, a cloud provider 110, and/or a participant system 130. System 100 may contemplate uses in association with web services, utility computing, pervasive and individualized computing, security and identity solutions, autonomic computing, cloud computing, commodity computing, mobility and wireless solutions, open source, biometrics, grid computing, and/or mesh computing.

In various embodiments, distributed ledger 101 may comprise one or more hardware and/or software components, and may comprise one or more databases capable of storing and maintaining data. For example, distributed ledger 101 may comprise one or more databases configured to store and maintain data regarding the deployment of cloud-based software, as discussed further herein.

In various embodiments, distributed ledger 101 may be based on one or more digital ledger technologies ("DLT"), as described herein, and may be configured to simplify and automate the deployment of cloud-based software by using the DLTs as a distributed and tamper-proof data store. For example, distributed ledger 101 may implement a DLT technology such as blockchain, tangle, or the like.

In various embodiments, distributed ledger 101 may comprise a blockchain network configured to maintain a blockchain. Distributed ledger 101 may be a peer-to-peer network that is private, federated, and/or public in nature (e.g., the ETHEREUM® system, the Bitcoin system, the HYPERLEDGER® Fabric system, etc.). Federated and private networks may offer improved control over the content of the blockchain and public networks may leverage the cumulative computing power of the network to improve security. Distributed ledger 101 may comprise various blockchain nodes (e.g., consensus participants) in electronic communication with each other, as discussed further herein. Each blockchain node may comprise a computing device configured to write blocks to the blockchain and validate blocks of the blockchain. The computing devices may take the form of a computer or processor, or a set of computers and/or processors or application specific integrated circuits (ASICs), although other types of computing units or systems may also be used. Exemplary computing devices include servers, pooled servers, laptops, notebooks, hand held computers, personal digital assistants, cellular phones, smart phones (e.g., an IPHONE® device, a BLACKBERRY® device, an ANDROID® device, etc.), tablets, wearables (e.g., smart watches and smart glasses), Internet of Things (IOT) devices, or any other device capable of receiving data over network. Each computing device may run applications to interact with distributed ledger 101, communicate with other devices, perform crypto operations, and otherwise operate within system 100. Computing devices may run a client application that can be a thin client (web), hybrid (i.e. web and native, such as iOS and ANDROID® systems), or native application to make API calls to interact with the blockchain, such as a web3 API compatible with blockchain databases maintained by the ETHEREUM® system.

The blockchain may be based on any blockchain technology such as, for example, ETHEREUM®, OPENCHAIN®, Chain Open Standard technology, HYPERLEDGER® Fabric, CORDA®, Connect™, Sawtooth™, etc. The blockchain may comprise a system of blocks containing data that are interconnected by reference to the previous block. Each block may link to the previous block and may include a timestamp. Data can be added to the blockchain by establishing consensus between the blockchain nodes based on proof of work, proof of stake, practical byzantine fault tolerance, delegated proof of stake, or other suitable consensus algorithms. When implemented in support of system 100, the blockchain may serve as an immutable log for the deployment of cloud-based systems and related contracts and processes.

A blockchain address may be uniquely assigned to each blockchain node or participant (e.g., cloud provider 110, one or more participant systems 130, etc.) to function as a unique identifier for each participant (e.g., cloud provider 110, participant systems 130, etc.) in distributed ledger 101.

In various embodiments, each participant may register with distributed ledger 101, and/or an existing trust participant (e.g., an identity provider), and may be assigned and provided a private key and public key pair. For example, in a permissioned blockchain consortium, each participant may procure a public key and private key pair from a third-party certificate authority (e.g., DIGICERT®, VERISIGN®, etc.). For example, in a blockchain consortium, one of the participants (e.g., cloud provider 110, or another trusted party) may initiate and create the distributed ledger 101 and may invite (or receive invitation requests from) one or more of the other participants to join the blockchain consortium. Invited participants may accept the request by transmitting a configuration request to join the blockchain consortium. The configuration request may be validated and/or approved by existing participants of the blockchain consortium using digital signature verification. The private key may be stored with each respective participant, and as discussed further herein, data can be encrypted with the public key prior to writing to distributed ledger 101.

In various embodiments, distributed ledger 101 may use a Hierarchical Deterministic (HD) solution to enable the creation of one or more child keys from one or more parent keys in a hierarchy. Each child key may be assigned to a participant in distributed ledger 101. For example, distributed ledger 101 may use BIP32, BIP39, and/or BIP44 to generate an HD tree of public addresses.

In various embodiments, distributed ledger 101 may host and/or implement one or more smart contracts. The smart contracts may control the end-to-end data flow in system 100 and may autonomously govern the deployment of cloud-based systems by supporting execution and recording of various deployment data, as discussed further herein. The smart contracts may comprise executables that write data to distributed ledger 101 in a predetermined format based on predetermined function parameters passed by an API call or the like. Each smart contract may include a program written in a programming language such as, for example, Go, NODE.JS®, JAVA®, KOTLIN®, Solidity, or any other suitable smart contract programming language.

For example, and in accordance with various embodiments, distributed ledger 101 may host and/or implement one or more deployment smart contracts 105. Deployment smart contract 105 may be initially deployed by cloud provider 110. Deployment smart contract 105 may be configured to be invoked by one or more participant systems 130 and/or cloud provider 110 to perform various operations disclosed herein. For example, deployment smart contract 105 may be configured to generate (or aid in generating) one or more system coalitions between a plurality of participant systems 130; deploy (or aid in deploying) cloud-based systems (e.g., deployed system 140), APIs (e.g., deployed API 145), and/or the like; and/or perform various auditing and accounting writes to distributed ledger 101, as discussed further herein.

In various embodiments, deployment smart contract 105 and/or one or more participants in distributed ledger 101 (e.g., blockchain nodes) may store and maintain a blockchain state repository. The blockchain state repository may comprise local copies of the state of distributed ledger 101, including up-to-date data from distributed ledger 101 based on the most recent transactions in distributed ledger 101 (e.g., the world state).

In various embodiments, cloud provider 110 may be in electronic communication with distributed ledger 101 and/or software repository 120. Cloud provider 110 may comprise one or more hardware, software, and/or database components. For example, cloud provider 110 may comprise one or more network environments, servers, computer-based systems, processors, databases, and/or the like. Cloud provider 110 may comprise at least one computing device in the form of a computer or processor, or a set of computers/processors, although other types of computing units or systems may be used such as, for example, a server, web server, pooled servers, or the like. Cloud provider 110 may also include software, such as services, APIs, and the like, configured to perform various operations discussed herein. In various embodiments, cloud provider 110 may include one or more processors and/or one or more tangible, non-transitory memories and be capable of implementing logic. The processor may be configured to implement various logical operations in response to execution of instructions, for example, instructions stored on a non-transitory, tangible, computer-readable medium, as discussed further herein.

In various embodiments, cloud provider 110 may comprise a cloud computing service provider such as, for example, ADOBE®, AMAZON WEB SERVICES® (AWS), GOOGLE CLOUD®, KAMATERA™, ORACLE CLOUD®, VERIZON® Cloud, etc.

Cloud provider 110 may be configured to provide various services, infrastructures, and computing resources for one or more participant systems 130. Cloud provider 110 may be configured to provide an on-demand availability of computer system resources, such as data storage, computing resources, etc. For example, and in accordance with various embodiments, cloud provider 110 may host a cloud platform 115. Cloud platform 115 may be configured to provide various computing services, such as, for example, storage, databases, servers, networking, software, etc. Cloud platform 115 may be configured to provide infrastructure as a service (IaaS) (e.g., infrastructure such as servers, operating systems, virtual machines, networks, storage, etc.), platform as a service (PaaS) (e.g., services used in developing, testing, and maintaining software), software as a service (SaaS) (e.g., users connect to hosted applications through the Internet), and/or the like.

As a further example, and as discussed herein, "cloud," "cloud computing," "cloud platform," and/or similar terms and phrases may include a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing.

In various embodiments, cloud provider 110 may be configured to deploy and/or host one or more deployed systems 140 and/or deployed APIs 145. For example, cloud provider 110 may be configured to deploy and/or host deployed system 140 and/or deployed API 145 via cloud platform 115.

Deployed system 140 may be initialized, installed, and/or deployed on cloud platform 115 via cloud provider 110. For example, cloud provider 110 may retrieve system software from software repository 120 and may execute and install the system software to deploy deployed system 140, as discussed further herein. Deployed system 140 may comprise any suitable combination of hardware, software, and/or database components. For example, deployed system 140 may include server and/or computer-based system resources, databases or file systems, applications, and/or the like. The components (and available functionalities) in deployed system 140 may be at least partially defined by the system software retrieved from software repository 120 and installed by cloud provider 110. In that respect, deployed system 140 may leverage the resources available in cloud platform 115 for one or more formed system coalitions. Deployed system 140 may be accessible by one or more participant systems 130 via deployed API 145.

Deployed API 145 may be initialized, installed, and/or deployed via cloud provider 110. Deployed API 145 may be software based and may comprise any suitable application programming interface (API), application, service, or the like. Deployed API 145 may be deployed on cloud platform 115, such as, for example, by being installed on existing platforms and systems on cloud platform 115, on deployed system 140, and/or the like. In various embodiments, deployed API 145 may also be deployed using any other suitable resources, wherein deployed API 145 is capable of performing operations (or causing operations to be performed) on deployed system 140. The available features, operations, and functionalities in deployed API 145 may be at least partially defined by the API software retrieved from software repository 120 and installed by cloud provider 110. As discussed further herein, one or more participant systems 130 may interact with, and perform functionalities on, deployed system 140 by transmitting an API call to deployed API 145. The API call may define API call functionalities to be performed by one or more components of deployed system 140.

In various embodiments, software repository 120 may be configured to store and maintain software, including scripts, downloadable packages, software scripts, and/or the like. For example, software repository 120 may store system software needed to execute, install, and/or deploy deployed system 140. Software repository 120 may also store API software needed to execute, install, and/or deploy deployed API 145. In various embodiments, the software stored in software repository 120 may be received from any suitable source. For example, the software may comprise open source software and may be retrieved or received from any suitable open source repository or source. The software may also be uploaded by cloud provider 110 and/or one or more participant systems 130. Software repository 120 may store the software in a location identified by a software repository identifier. The software repository identifier may comprise a URL, or the like, identifying the location in software repository 120 that the software is stored and may be retrieved from.

Software repository 120 may comprise any suitable database, data structure, file system, list, file, repository, or the like described herein. In various embodiments, software repository 120 may comprise a web-based hosting service configured to store and maintain software code. In various embodiments, software repository 120 may comprise a web-based hosting service such as GITHUB® provided by GitHub, Inc. Software repository 120 may maintain the software code using version controls and/or any other suitable or desired management functionalities.

In various embodiments, system 100 may comprise one or more participant systems 130 configured to interact with cloud provider 110 and/or distributed ledger 101. For example, system 100 may comprise a first participant system 130-1, a second participant system 130-2, an "Nth" participant system 130-n, etc. Each participant system 130 may be in electronic communication with distributed ledger 101 and/or one or more deployed APIs 145. In various embodiments, one or more participant systems 130 may also be in electronic communication with cloud provider 110 and/or software repository 120.

In various embodiments, one or more participant systems 130 may comprise a user device having various hardware, software, and/or database components capable of sending, receiving, and storing data. For example, one or more participant systems 130 may comprise a personal computer, personal digital assistant, cellular phone, smartphone, Internet of Things (IoT) device, and/or the like. One or more participant systems 130 may comprise an operating system as discussed herein. One or more participant systems 130 may also comprise software components installed on the participant system 130 and configured to allow the participant system 130 access to various systems, services, and components in system 100. For example, the participant system 130 may comprise a web browser, an application, a micro-app or mobile application, or the like configured to allow the participant system 130 access to various systems, services, and components in system 100.

In various embodiments, one or more participant systems 130 may comprise one or more network environments, servers, computer-based systems, processors, databases, and/or the like. The participant system 130 may comprise at least one computing device in the form of a computer or processor, or a set of computers/processors, although other types of computing units or systems may be used such as, for example, a server, web server, pooled servers, or the like. The participant system 130 may also include software, such as services, APIs, and the like, configured to perform various operations discussed herein. In various embodiments, the participant system 130 may include one or more processors and/or one or more tangible, non-transitory memories and be capable of implementing logic. The processor may be configured to implement various logical operations in response to execution of instructions, for example, instructions stored on a non-transitory, tangible, computer-readable medium, as discussed further herein.

Each participant system 130 may be configured to interact with systems and components of system 100 to register with cloud provider 110, form and/or join one or more system coalitions, deploy systems in cloud platform 115 as part of a system coalition (or approve the deployment of systems in cloud platform 115), deploy APIs to access deployed systems 140 in cloud platform 115 (or approve the deployment of APIs), and/or the like, as discussed further herein.

In various embodiments, wherein distributed ledger 101 comprises blockchain-based technology (or similar technology), cloud provider 110 and/or one or more participant systems 130 (e.g., first participant system 130-1, second participant system 130-2, Nth participant system 130-n, etc.) may comprise a blockchain node. The blockchain node may be configured to maintain a copy of the blockchain maintained by distributed ledger 101, write and/or retrieve data and blocks from the blockchain, validate blocks of the blockchain, and/or propagate writes to the blockchain to distributed ledger 101. Each blockchain node may communicate with one or more other blockchain nodes to validate and write blocks to the blockchain, and to establish consensus between the blockchain nodes based on proof of work, proof of stake, practical byzantine fault tolerance, delegated proof of stake, or other suitable consensus algorithms. The blockchain node may comprise one or more computing devices, such as, for example a computer or processor, or a set of computers, processor, and/or application specific integrated circuits (ASICs), although other types of computing units or system may also be used. Exemplary computing devices may include servers, pooled servers, laptops, notebooks, hand held computers, personal digital assistants, cellular phones, smart phones as discussed herein, tablets, wearables (e.g., smart watches, smart glasses, etc.), Internet of things (IoT) devices, or any other device capable of receiving data over a network. The blockchain node may run applications to interact with the blockchain and distributed ledger 101, communicate with other devices, perform crypto operations, and otherwise operate within system 100.

In various embodiments, cloud provider 110 and/or one or more participant systems 130 (e.g., first participant system 130-1, second participant system 130-2, Nth participant system 130-n, etc.) may also be configured to write and retrieve data from distributed ledger 101 without the use of a blockchain node. For example, cloud provider 110 and/or one or more participant systems 130 may communicate with distributed ledger 101 via a ledger communicator comprising one or more hardware, software, services, interfaces, and/or the like, and configured to enabled communications with distributed ledger 101.

For example, the ledger communicator may comprise one or more of an application programming interface (API), a software development kit (SDK), a web service, and/or the like. The ledger communicator may comprise programmatic libraries configured to translate and transmit queries and commands between cloud provider 110 and/or one or more participant systems 130 and distributed ledger 101. For example, and in accordance with various embodiments, the ledger communicator may be configured to translate requests from cloud provider 110 and/or one or more participant systems 130 into a blockchain format using a blockchain SDK library, or the like, which may include digital signing using system or subsystem-specific security certificates. In that respect, cloud provider 110 and/or one or more participant systems 130 may comprise one or more system or subsystem-specific cryptographic keys used to perform cryptographic operations. As a further example, and in accordance with various embodiments, the ledger communicator may be configured to translate data, notifications, and the like retrieved from distributed ledger 101 into a format readable by cloud provider 110 and/or one or more participant systems 130, which may include digital signature verification and/or data transformation from a blockchain specific data layout to an application specific data layout.

As a further example, and in accordance with various embodiments, the ledger communicator may include a blockchain oracle configured to generate one or more notifications in response to data being written to distributed ledger 101. The blockchain oracle may be configured to query distributed ledger 101 (or a blockchain node of distributed ledger 101) at a defined interval to search for new writes to distributed ledger 101. The blockchain oracle may be controlled by notification triggers containing filters indicating the types of data written to distributed ledger 101 that will generate a notification. For example, in response to the blockchain oracle determining that data has been written to distributed ledger 101 that includes an identifier corresponding with first participant system 130-1, the blockchain oracle may generate a notification and transmit the notification to first participant system 130-1.

In various embodiments, in a practical application the participant systems 130 may comprise separate organizations or entities, teams or groups within the same organization or entity, individuals, and/or the like desiring to form a system coalition to leverage resources of cloud provider 110. For example, and in accordance with various embodiments, each participant system 130 may comprise entities involved in a supply chain. For example, a first participant system may be placing an order with a second participant system for materials; a third participant system may be a bank or payment network financing one or more of the participant systems, or enabling payments between the participant systems; a fourth participant system may be a shipping company configured to ship the materials; etc. As a further example, and in accordance with various embodiments, each participant system 130 may be a merchant forming a loyalty coalition. For example, the participant systems may form together to offer rewards to customers in response to the customer purchasing goods or services from one or more of the merchants in the loyalty coalition.

The participant systems may not trust each other. In various embodiments, the distributed ledger may create an immutable record of events, functionalities, and actions taken by each participant in the system coalition to create trust between the parties. By leveraging resources available by cloud provider 110, system 100 creates a hybrid approach to improve computing efficiencies (by leveraging resources from cloud provider 110) while also creating trust between the parties involved in the system coalition (by leveraging functionalities provided by distributed ledger 101).

Referring now to FIGS. 2-5 the process flows and screenshots depicted are merely embodiments and are not intended to limit the scope of the disclosure. For example, the steps recited in any of the method or process descriptions may be executed in any order and are not limited to the order presented. It will be appreciated that the following description makes appropriate references not only to the steps and user interface elements depicted in FIGS. 2-5, but also to the various system components as described above with reference to FIG. 1. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below. Unless otherwise specifically noted, articles depicted in the drawings are not necessarily drawn to scale.

Figure 2:
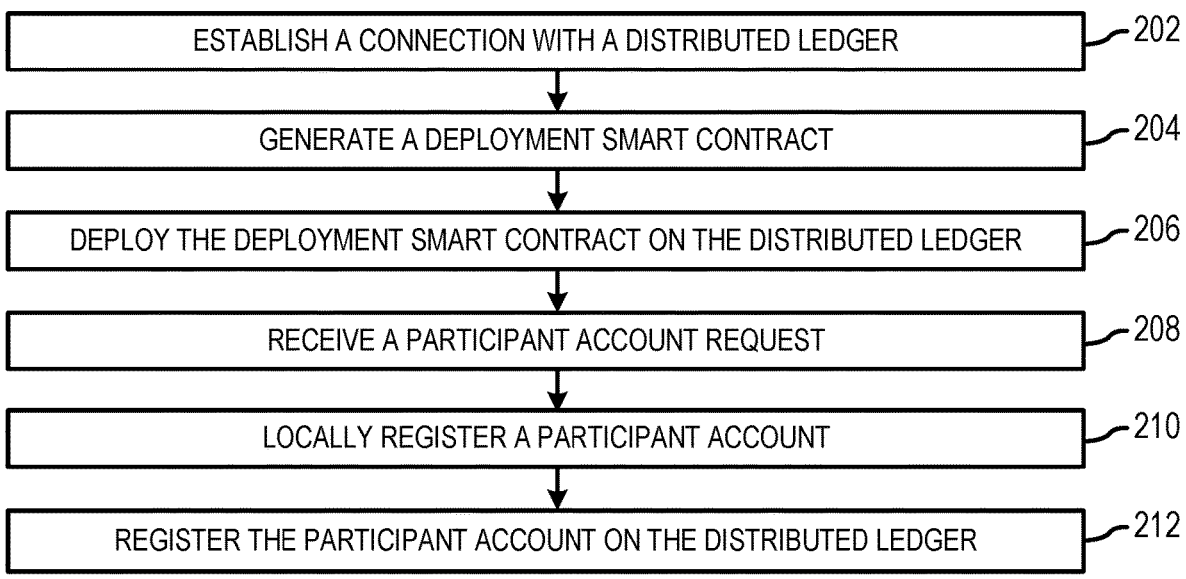
FIG. 2 illustrates a process flow for a method of registering for a system for deploying cloud-based applications, in accordance with various embodiments.

In various embodiments, and with specific reference to FIG. 2, a method 201 of registering for a system for deploying cloud-based applications is disclosed. Method 201 may comprise establishing a connection with a distributed ledger (step 202). For example, cloud provider 110 may establish a connection with distributed ledger 101. Cloud provider 110 may establish the connection using any process or technique, such as, for example, by registering with distributed ledger 101. The registration process may comprise a standard distributed ledger and/or blockchain registration process, and may include distributed ledger 101 assigning a cloud provider identifier (e.g., a blockchain address, a public key and private key pair, etc.) to cloud provider 110.

Method 201 may comprise generating a deployment smart contract (step 204). Cloud provider 110 may be configured to generate deployment smart contract 105. In various embodiments, cloud provider 110 may be configured to generate deployment smart contract 105. For example, cloud provider 110 may generate deployment smart contract 105 by programming (all or a portion of) the deployment smart contract 105, by interacting with software configured to generate preprogrammed smart contracts, and/or the like. In various embodiments, cloud provider 110 may be configured to retrieve a deployment smart contract from software repository 120. In that regard, software repository 120 may store and maintain one or more deployment smart contracts, with one or more of the deployment smart contracts having distinct or configurable properties. Cloud provider 110 may browse available deployment smart contracts from software repository 120 (e.g., template smart contracts), and select and retrieve the deployment smart contract comprising desired properties.

Method 201 may comprise deploying the deployment smart contract on the distributed ledger (step 206). Cloud provider 110 may be configured to deploy deployment smart contract 105 on to distributed ledger 101. Cloud provider 110 may deploy deployment smart contract 105 using any suitable process. For example, cloud provider 110 may transmit to distributed ledger 101 the cloud provider identifier and deployment smart contract 105. In response to receiving deployment smart contract 105, distributed ledger 101 may write deployment smart contract 105 to distributed ledger 101 to deploy deployment smart contract 105. In various embodiments, in response to completing deployment of deployment smart contract 105, distributed ledger 101 may transmit an event notification to cloud provider 110 notifying cloud provider 110 of the completed deployment (and/or cloud provider 110 may receive the event notification from associated software, such as a blockchain oracle).

In various embodiments, wherein distributed ledger 101 comprises blockchain technology (or similar technology), cloud provider 110 may invoke a local blockchain node, blockchain API, ledger communicator, or the like to write deployment smart contract 105 to distributed ledger 101. In response to being invoked, the local blockchain node, blockchain API, ledger communicator, or the like may propagate deployment smart contract 105 to consensus participants by transmitting deployment smart contract 105 to the consensus participants and/or by writing deployment smart contract 105 to distributed ledger 101. In various embodiments, the deployment smart contract write may also include data corresponding to cloud provider 110, such as, for example, the cloud provider identifier. The consensus participants may achieve consensus and add deployment smart contract 105 to distributed ledger 101. For example, the consensus participants may achieve consensus using proof of work, proof of stake, practical byzantine fault tolerance, delegated proof of stake, or other suitable consensus algorithm. The consensus participants may write deployment smart contract 105 to distributed ledger 101 using any suitable technique. In response to achieving consensus and completing the write, the consensus participants may transmit a write confirmation to cloud provider 110. The write confirmation may comprise data indicating that deployment smart contract 105 was successfully written to distributed ledger 101. In various embodiments, the write confirmation may also comprise data pointing to the location of the write on distributed ledger 101, such as a uniform resource locator (URL), or the like.

The system may receive a participant account request (step 208). In various embodiments, one or more participant systems 130 may register with cloud provider 110 to enable the participant system 130 to join one or more system coalitions, deploy cloud-based systems, and/or interact with deployed cloud-based systems, and/or the like, as discussed further herein. For example, a participant system 130 may transmit the participant account request to cloud provider 110. The participant account request may comprise data regarding the participant system 130, such as, for example, identifying information (e.g., name, company, contact information, etc.), billing information, and/or the like. The participant account request may also comprise user authentication data, such as, for example, a username, a password, a biometric input, and/or the like. In various embodiments, the participant system 130 may comprise a preexisting account with cloud provider 110. The user authentication data may be used to authenticate the user. In various embodiments, the participant system 130 may not be preregistered with cloud provider 110. The user authentication data may be user to establish a new participant account with cloud provider 110.

A participant account may be locally registered (step 210). For example, cloud provider 110 may locally register the participant account by updating databases and systems within cloud provider 110 to establish the participant account for the participant system 130.

The participant account may be registered on the distributed ledger (step 212). For example, cloud provider 110 may invoke deployment smart contract 105 to register the participant account on distributed ledger 101. Cloud provider 110 may invoke deployment smart contract 105 by passing data from the participant account request, such as, for example, participant identifying data. The participant registration process may comprise a standard distributed ledger and/or blockchain registration process, and may include distributed ledger 101 assigning a participant identifier (e.g., a blockchain address, a public key and private key pair, etc.) to cloud provider 110. In various embodiments, in response to completing the participant registration, distributed ledger 101 may return the participant identifier to cloud provider 110. Cloud provider 110 may update the local participant account to include the participant identifier. In response to updating the local participant account, cloud provider 110 may also return the participant identifier to the participant system 130. In various embodiments, in response to completing the participant registration, distributed ledger 101 may also return the participant identifier directly to the participant system 130. In response to receiving the participant identifier, the participant system 130 may establish a connection with distributed ledger 101.

In various embodiments, any number of participant systems 130 may register with cloud provider 110. For example, first participant system 130-1, second participant system 130-2, Nth participant system 130-n, etc. may each separately register with cloud provider 110. In various embodiments, a participant system 130 may also register multiple participant accounts with cloud provider 110, including subaccounts, child accounts, or the like. For example, an organization or entity may desire to establish different participant account for discrete businesses or teams within the organization or entity.

Figure 3:
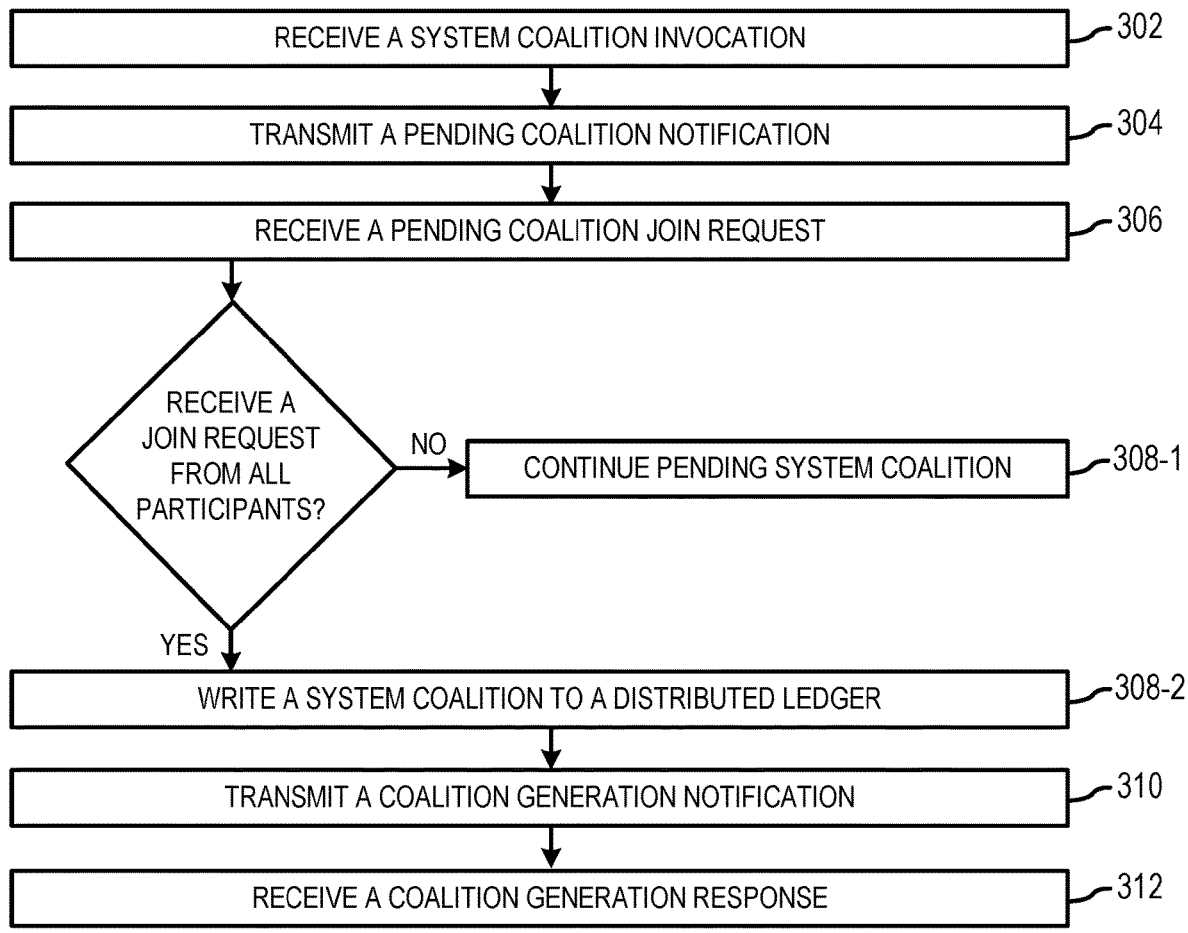
FIG. 3 illustrates a process flow for a method of forming a software coalition, in accordance with various embodiments.

In various embodiments, and with specific reference to FIG. 3, a method 301 of forming a system coalition is disclosed. In various embodiments, a plurality of participant systems 130 may desire to form a system coalition to leverage resources available on cloud platform 115 by deploying one or more systems, databases, applications, and the like. Method 301 may comprise receiving a system coalition invocation (step 302). Deployment smart contract 105 may receive the system coalition invocation from a participant system 130. The system coalition invocation may comprise the participant identifier associated with the invoking participant system 130, one or more participant identifiers associated with participant systems 130 invited to join the coalition, a software repository identifier of system software to be installed in cloud platform 115 (e.g., a URL identifying the location in software repository 120 to retrieve the system software), a system coalition identifier, and/or any other data needed to form the system coalition.

In response to receiving the system coalition invocation, deployment smart contract 105 may write the system coalition invocation to distributed ledger 101. For example, in a blockchain implementation, the write may include performing cryptographic operations on the system coalition invocation, establishing consensus on the write between consensus participants, and/or the like. Method 301 may comprise transmitting a pending coalition notification (step 304). For example, in response to completing the system coalition invocation write, deployment smart contract 105 may transmit the pending coalition notification to each participant system 130 specified in the system coalition invocation (e.g., based on participant identifier). In various embodiments, one or more of the specified participant systems 130 may also receive the pending coalition notification from associated software on the participant system 130, such as, for example, via a blockchain oracle.

A pending coalition join request may be received (step 306). Deployment smart contract 105 may receive the pending coalition join request from a participant system 130. For example, in response to receiving the pending coalition notification, a participant system 130 may generate and transmit the pending coalition join request to deployment smart contract 105. The pending coalition join request may comprise data indicating that the participant system 130 desires to join the system coalition (e.g., based on a system coalition identifier), and may include identifying data such as the participant identifier. In response to receiving the pending coalition join request, deployment smart contract 105 may perform operations to verify the participant system 130. For example, deployment smart contract 105 may compare the received participant identifier against the participant identifiers specified in the system coalition invocation.

In response to being unable to locate a specified participant identifier matching the received participant identifier, deployment smart contract 105 may return a notification indicating that the participant system 130 is unable to join the system coalition. In response to verifying the participant system 130 (e.g., determining that the received participant identifier matches a specified participant identifier), deployment smart contract 105 may update the system coalition invocation to include the verified participant system 130. Deployment smart contract 105 may write the pending coalition join request to distributed ledger 101.

A system coalition may be written to the distributed ledger (step 308-2). Deployment smart contract 105 may be configured to write the system coalition to distributed ledger 101. For example, deployment smart contract 105 may write the system coalition in response to receiving pending coalition join requests from each participant system 130 specified in the system coalition invocation. In response to deployment smart contract 105 not receiving a pending coalition join request from all participant systems 130 specified in the system coalition invocation, the system coalition may remain pending (step 308-1). The system coalition write may comprise data indicating that the system coalition was successfully formed, and may include the participant identifiers of each participant system 130, the software repository identifier of system software to be installed in cloud platform 115, the system coalition identifier, and/or the like. Deployment smart contract 105 may write the system coalition to distributed ledger 101 using any suitable process or technique.

A coalition generation notification may be transmitted (step 310). For example, in response to writing the system coalition to distributed ledger 101, deployment smart contract 105 may transmit the coalition generation notification to cloud provider 110. In various embodiments, cloud provider 110 may also receive the coalition generation notification from associated software on cloud provider 110, such as, for example, via a blockchain oracle. The coalition generation notification may comprise data indicating that the system coalition was successfully formed. For example, the coalition generation notification may comprise the coalition identifier, the URL of the write on distributed ledger 101, the participant identifiers associated with each participant system 130 that joined the system coalition, the software repository identifier of system software to be installed as part of the system coalition, and/or the like.

In various embodiments, in response to receiving the coalition generation notification cloud provider 110 may be configured to complete setup of the system coalition. For example, cloud provider 110 may update the local participant accounts corresponding with each specified participant system 130 (e.g., based on participant identifier) to establish that the participant system 130 joined the system coalition. In various embodiments, updating the local participant account may also include updating billing information associated with each participant system 130. For example, cloud provider 110 may charge a usage cost for joining the system coalition, for performing functionalities using deployed systems, and/or the like. Cloud provider 110 may also be configured to retrieve the system software from software repository 120. For example, cloud provider 110 may query software repository 120 based on the software repository identifier to locate the system software stored in software repository 120. The system software may comprise an install script, downloadable software packages, and/or the like needed to deploy the software on cloud platform 115. Cloud provider 110 may deploy the system software (e.g., deployed system 140) on cloud platform 115 by retrieving and executing the install scripts, downloading the software packages, installing the specified software stacks (e.g., databases, application services, etc.), and/or the like.

A coalition generation response may be received (step 312). For example, in response to cloud provider 110 completing setup of the system coalition and/or installation of deployed system 140, cloud provider 110 may return the coalition generation response to deployment smart contract 105. The coalition generation response may comprise data indicating that the system coalition was successfully created and/or that deployed system 140 was successfully initialized. In various embodiments, the coalition generation response may also comprise auditing and billing information for the participant systems 130 that joined the system coalition. In response to receiving the coalition generation response, deployment smart contract 105 may write the coalition generation response to distributed ledger 101.

Figure 4:
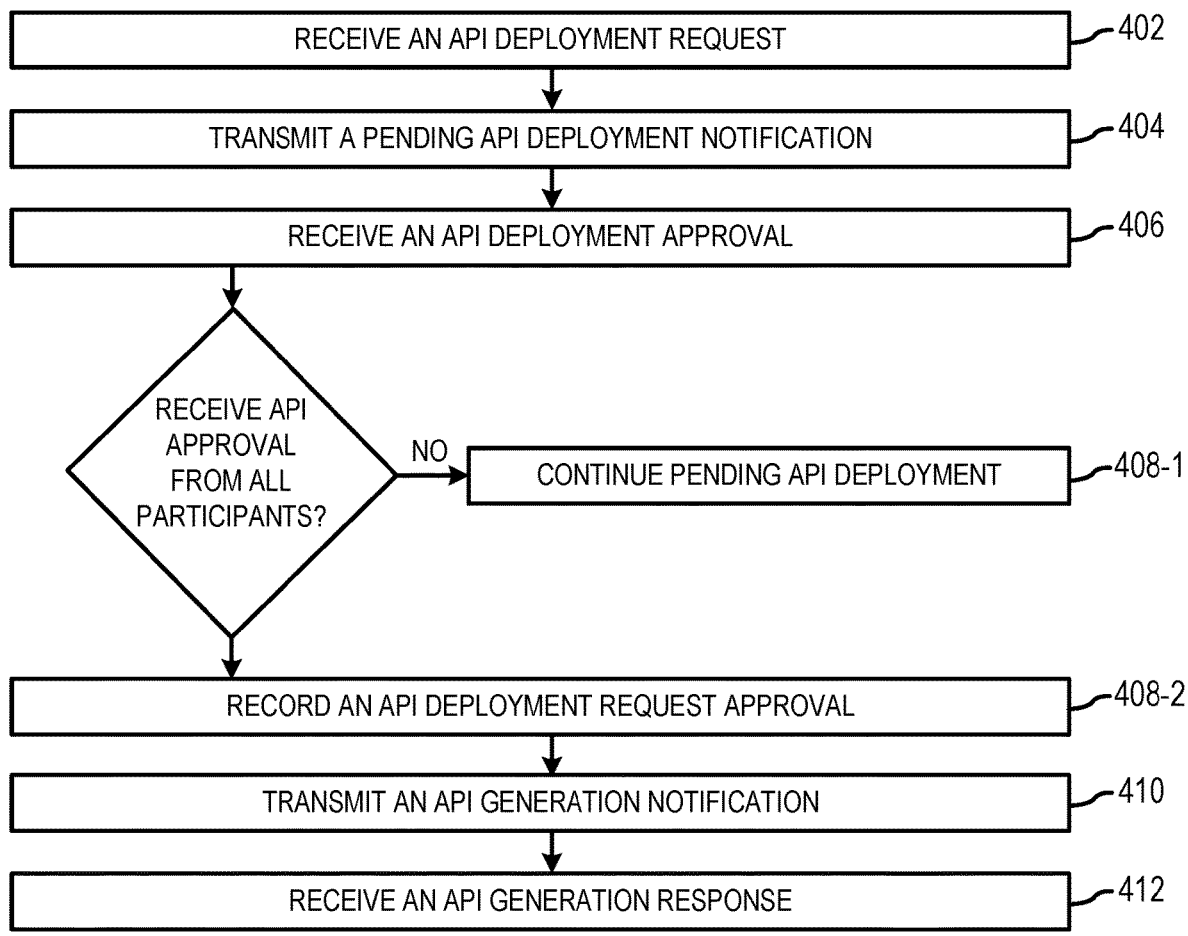
FIG. 4 illustrates a process flow for a method of deploying an API to access a cloud-based system, in accordance with various embodiments.

In various embodiments, and with specific reference to FIG. 4, a method 401 of deploying an API to access the deployed cloud-based system is disclosed. The API may be deployed to enable the participant systems 130 that joined the system coalition to perform various functionalities using deployed system 140 in cloud platform 115. Method 401 may comprise receiving an API deployment request (step 402). Deployment smart contract 105 may receive the API deployment request from a participant system 130. In various embodiments, the API deployment request may be transmitted by the same participant system 130 that transmitted the system coalition invocation. In various embodiments, the API deployment request may also be transmitted by a different participant system 130 that joined the system coalition. The API deployment request may comprise data requesting cloud provider 110 to deploy one or more APIs, and may comprise the system coalition identifier, an API repository identifier associated with APIs to be installed in cloud platform 115 (e.g., a URL identifying the location in software repository 120 to retrieve the APIs), and/or the like.

In various embodiments, the API deployment request may also comprise or define participant system identifiers needed to approve the API deployment request. In that regard, the API deployment request may not need approval from all participant systems 130 in order to be approved. In various embodiments, the API development request may also comprise all participant system identifiers from the system coalition such that all participant systems 130 need to approval the API deployment request before the API may be deployed. In response to receiving the API deployment request, deployment smart contract 105 may write the API deployment request to distributed ledger 101.

A pending API deployment notification may be transmitted (step 404). Deployment smart contract 105 may be configured to transmit the pending API deployment notification to one or more participant systems 130 in response to receiving the API deployment request. For example, deployment smart contract 105 may transmit the pending API deployment notification to each participant system 130 specified in the API deployment request (or the system coalition), based on participant identifier. In various embodiments, one or more of the specified participant systems 130 may also receive the pending API deployment notification from associated software on the participant system 130, such as, for example, via a blockchain oracle.

An API deployment approval may be received (step 406). Deployment smart contract 105 may receive the API deployment approval from a participant system 130. For example, in response to receiving the pending API deployment notification, a participant system 130 may generate and transmit the API deployment approval to deployment smart contract 105. The API deployment approval may comprise data indicating that the participant system 130 approves deployment an API to access deployed system 140, and may include identifying data such as the participant identifier. In response to receiving the API deployment approval, deployment smart contract 105 may perform operations to verify the participant system 130. For example, deployment smart contract 105 may compare the received participant identifier against the participant identifiers specified in the API deployment request and/or the system coalition. Deployment smart contract 105 may write the API deployment approval to distributed ledger 101 using any suitable process or technique.

An API deployment request approval may be recorded (step 408-2). Deployment smart contract 105 may be configured to write the API deployment request approval to distributed ledger 101 in response to receiving API deployment approvals from each participant system 130 specified in the API deployment request and/or the system coalition. In response to deployment smart contract 105 having not received API deployment approvals from all participant systems 130 specified in the API deployment request and/or the system coalition, the API deployment may remain pending (step 408-1). The API deployment request approval write may comprise data indicating that deployment of the API was approved, and may include the participant identifiers of each participant system 130 approving the API deployment, the API repository identifier of the API to be deployed, the system coalition identifier, and/or the like. Deployment smart contract 105 may write the API deployment request approval to distributed ledger 101 using any suitable process or technique.

An API generation notification may be transmitted (step 410). For example, in response to writing the API deployment request approval to distributed ledger 101, deployment smart contract 105 may transmit the API generation notification to cloud provider 110. In various embodiments, cloud provider 110 may also receive the API generation notification from associated software on cloud provider 110, such as, for example, via a blockchain oracle. The API generation notification may comprise data indicating that the deployment of an API to access deployed system 140 was approved. For example, the API generation notification may comprise the coalition identifier, the URL of the write on distributed ledger 101, the participant identifiers associated with each participant system 130 that approved the deployment of the API and/or that joined the system coalition, the API repository identifier of API to be deployed, and/or the like.

In various embodiments, in response to receiving the API generation notification cloud provider 110 may be configured to complete deployment of the API. For example, cloud provider 110 may update the local participant accounts corresponding with each specified participant system 130 (e.g., based on participant identifier) to establish that the participant system 130 approved deployment of the API. In various embodiments, updating the local participant account may also include updating billing information associated with each participant system 130. For example, cloud provider 110 may charge a usage cost for deploying the API, for performing functionalities using the deployed API, and/or the like.

Cloud provider 110 may also be configured to retrieve the API software from software repository 120. For example, cloud provider 110 may query software repository 120 based on the API repository identifier to locate the API software stored in software repository 120. The API software may comprise an install script, downloadable software packages, and/or the like needed to deploy the API. Cloud provider 110 may deploy the API (e.g., deployed API 145) by retrieving and executing the install scripts. Deployed API 145 may be installed and deployed on cloud platform 115 to leverage existing infrastructure and software, including deployed system 140. Deployed API 145 may also be installed and deployed on any other system, server, or the like, and may be configured to communicate with deployed system 140 in cloud platform 115.

An API generation response may be received (step 412). For example, in response to cloud provider 110 completing setup and deployment of the API, cloud provider 110 may return the API generation response to deployment smart contract 105. The API generation response may comprise data indicating that the API was successfully deployed. In various embodiments, the API generation response may also comprise auditing and billing information for the participant systems 130 in the system coalition, and/or the participant systems 130 that approved deployment of the API. In response to receiving the API generation response, deployment smart contract 105 may write the API generation response to distributed ledger 101.

Figure 5:
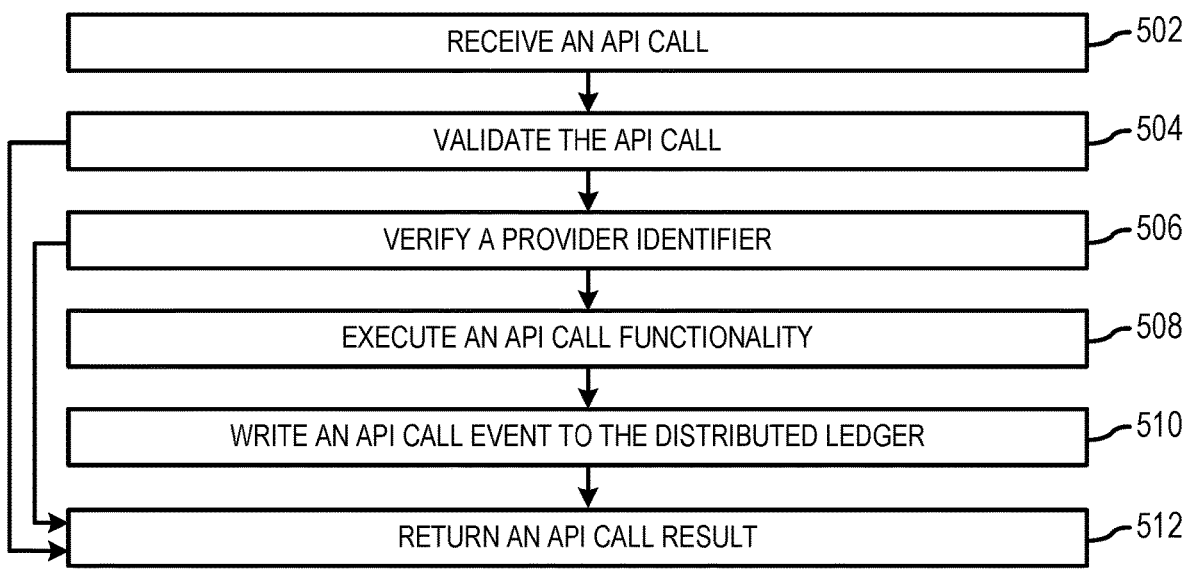
FIG. 5 illustrates a process flow for a method of accessing the cloud-based system, in accordance with various embodiments.

In various embodiments, and with specific reference to FIG. 5, a method 501 of accessing a deployed cloud-based system is disclosed. Participant systems 130 may interact with deployed API 145 to access and perform various functionalities on deployed system 140. Method 501 may comprise receiving an API call (step 502). Cloud provider 110, via deployed API 145, may be configured to receive the API call. The API call may be transmitted by one or more participant systems 130 that are part of a system coalition (e.g., as formed in method 301, with brief reference to FIG. 3). For example, a participant system 130 may transmit the API call by invoking deployed API 145. The API call may comprise a participant identifier (e.g., associated with the participant system that invoked deployed API 145) and may comprise an API call functionality. The API call functionality may comprise operations, functionalities, and/or the like be performing using deployed system 140. For example, the API call functionality may include parameters to be recorded in one or more databases in deployed system 140. As a further example, the API call functionality may include data operations to be executed on data stored in one or more databases in deployed system 140. In various embodiments, the API call may comprise a MAC (message authentication code) token, a JWOT token, or the like, and may be used by cloud provider 110 to validate the participant system 130 initiating the API call.

The API call may be validated (step 504). Cloud provider 110 may be configured to validate the API call in response to receiving the API call. Cloud provider 110 may validate the API call to ensure that the API call is originating from a participant system 130. For example, cloud provider 110 may validate the API call by validating the MAC token, the JWOT token, or the like from the API call. Cloud provider 110 may validate the token using any suitable token validation technique. In response to the validation failing, cloud provider 110 may return an API call result indicating that the API call failed (e.g., step 512).

A provider identifier may be verified (step 506). Cloud provider 110 may verify the provider identifier from the API call. For example, cloud provider 110 may invoke deployment smart contract 105 to verify the participant identifier. Deployment smart contract 105 may verify the participant identifier by comparing the participant identifier against registered participant identifiers. In response to determining a match, deployment smart contract 105 may return to cloud provider 110 a verification passed response. In response to being unable to determine a match, deployment smart contract 105 may return to cloud provider 110 a verification failed response. In various embodiments, deployment smart contract 105 may also verify the participant identifier using any other verification technique or process, including cryptographic processes standard to blockchain technologies. In response to the verification failing, cloud provider 110 may return an API call result indicating that the API call failed (e.g., step 512).

The API call functionality may be executed (step 508). In response to validating and verifying the API call, cloud provider 110 may be configured to execute the API call functionality on deployed system 140. For example, cloud provider 110 may execute (or cause to be executed) the API call functionality on the systems, databases, applications, etc. in deployed system 140.

An API call event may be written to the distributed ledger (step 510). Cloud provider 110 may invoke deployment smart contract 105 to write the API call event to distributed ledger 101, in response to completing execution of the API call functionality. The API call event may comprise data regarding the API call. For example, the API call event may comprise the API call functionality, an API call result (e.g., success, failed, etc.), the participant identifier, and/or the like. In various embodiments, the API call event may also comprise API billing data, such as, for example, costs incurred by one or more participant systems 130 as a result of executing the API call functionality. Cloud provider 110 may generate the API call event and transmit the API call event to deployment smart contract 105 to invoke deployment smart contract 105. In response to being invoked, deployment smart contract 105 may write the API call event to distributed ledger 101, using any suitable process or technique.

The API call result may be returned (step 512). Cloud provider 110 may return the API call result, via deployed API 145, to participant system 130. In various embodiments, the API call result may comprise a URL, or other suitable indicator, detailing the location in distributed ledger 101 that the API call event was written.

In various embodiments, participant systems 130 in the system coalition may continue to transmit API calls, via deployed API 145, to interact with components of deployed system 140. Deployed API 145 and deployed system 140 may persist for as long as participant systems 130 desire, and/or based on resource availability from cloud provider 110.

In various embodiments, participant systems 130 may desire to decommission deployed API 145 and/or deployed system 140. Deployed API 145 and/or deployed system 140 may be decommissioned using any suitable process. For example, decommission of deployed API 145 and/or deployed system 140 may be controlled by a vote (e.g., a decommission vote) of participant systems 130. Each participant system 130 may invoke deployment smart contract 105 by transmitting the vote. In response to receiving a vote from each participant system 130 joined in the system coalition, deployment smart contract 105 may transmit a decommission request notification to cloud provider 110. Deployment smart contract 105 may write each received vote and/or the decommission request notification to distributed ledger 101. In response to receiving the decommission request notification, cloud provider 110 may decommission and/or deactivate deployed API 145 and/or deployed system 140.

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. Furthermore, any reference to singular includes plural embodiments, and any reference to more than one component may include a singular embodiment. Although specific advantages have been enumerated herein, various embodiments may include some, none, or all of the enumerated advantages.

Systems, methods, and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "transmit" may include sending at least a portion of electronic data from one system component to another. Additionally, as used herein, "data," "information," or the like may include encompassing information such as commands, queries, files, messages, data for storage, and the like in digital or any other form.

As used herein, "electronic communication" may comprise a physical coupling and/or non-physical coupling capable of enabling system components to transmit and receive data. For example, "electronic communication" may refer to a wired or wireless protocol such as a CAN bus protocol, an Ethernet physical layer protocol (e.g., those using 10BASE-T, 100BASE-T, 1000BASE-T, etc.), an IEEE 1394 interface (e.g., FireWire), Integrated Services for Digital Network (ISDN), a digital subscriber line (DSL), an 802.11a/b/g/n/ac signal (e.g., Wi-Fi), a wireless communications protocol using short wavelength UHF radio waves and defined at least in part by IEEE 802.15.1 (e.g., the BLUETOOTH® protocol maintained by Bluetooth Special Interest Group), a wireless communications protocol defined at least in part by IEEE 802.15.4 (e.g., the ZIGBEE® protocol maintained by the ZigBee alliance), a cellular protocol, an infrared protocol, an optical protocol, or any other protocol capable of transmitting information via a wired or wireless connection.

One or more of the system components may be in electronic communication via a network. As used herein, the term "network" may further include any cloud, cloud computing system, or electronic communications system or method that incorporates hardware and/or software components. Communication amongst the nodes may be accomplished through any suitable communication channels such as, for example, a telephone network, an extranet, an intranet, Internet, point of interaction device (personal digital assistant, cellular phone, kiosk, tablet, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using Internetwork Packet Exchange (IPX), APPLETALK® program, IP-6, NetBIOS, OSI, any tunneling protocol (e.g. IPsec, SSH, etc.), or any number of existing or future protocols. If the network is in the nature of a public network, such as the internet, it may be advantageous to presume the network to be insecure and open to eavesdroppers. Specific information related to the protocols, standards, and application software utilized in connection with the Internet is generally known to those skilled in the art and, as such, need not be detailed herein.

The various system components may be independently, separately or collectively suitably coupled to the network via data links which includes, for example, a connection to an Internet Service Provider (ISP) over the local loop as is typically used in connection with standard modem communication, cable modem, DISH NETWORKS®, ISDN, DSL, or various wireless communication methods. It is noted that the network may be implemented as other types of networks, such as an interactive television (ITV) network. Moreover, the system contemplates the use, sale or distribution of any goods, services or information over any network having similar functionality described herein.

A network may be unsecure. Thus, communication over the network may utilize data encryption. Encryption may be performed by way of any of the techniques now available in the art or which may become available—e.g., Twofish, RSA, El Gamal, Schorr signature, DSA, PGP, PKI, GPG (GnuPG), HPE Format-Preserving Encryption (FPE), Voltage, Triple DES, Blowfish, AES, MD5, HMAC, IDEA, RC6, and symmetric and asymmetric cryptosystems. Network communications may also incorporate SHA series cryptographic methods, elliptic-curve cryptography (e.g., ECC, ECDH, ECDSA, etc.), and/or other post-quantum cryptography algorithms under development.

For the sake of brevity, conventional data networking, application development, and other functional aspects of the system may not be described in detail herein. Furthermore, the connecting lines shown in the various figures contained herein are intended to represent exemplary functional relationships and/or electronic communications between the various elements. It should be noted that many alternative or additional functional relationships or electronic communications may be present in a practical system.

As used herein, "satisfy," "meet," "match," "associated with", or similar phrases may include an identical match, a partial match, meeting certain criteria, matching a subset of data, a correlation, satisfying certain criteria, a correspondence, an association, an algorithmic relationship, and/or the like. Similarly, as used herein, "authenticate" or similar terms may include an exact authentication, a partial authentication, authenticating a subset of data, a correspondence, satisfying certain criteria, an association, an algorithmic relationship, and/or the like.

Terms and phrases similar to "associate" and/or "associating" may include tagging, flagging, correlating, using a look-up table or any other method or system for indicating or creating a relationship between elements such as, for example, (i) a transaction account and (ii) an item (e.g., offer, reward, discount, etc.) and/or digital channel. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input, and/or any other method known in the art.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, UNIX®, LINUX®, SOLARIS®, MACOS®, etc.) as well as various conventional support software and drivers typically associated with computers.

The present system, or any part(s) or function(s) thereof, may be implemented using hardware, software, or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations or any of the operations may be conducted or enhanced by artificial intelligence (AI) or machine learning. Artificial intelligence may refer generally to the study of agents (e.g., machines, computer-based systems, etc.) that perceive the world around them, form plans, and make decisions to achieve their goals. Foundations of AI include mathematics, logic, philosophy, probability, linguistics, neuroscience, and decision theory. Many fields fall under the umbrella of AI, such as computer vision, robotics, machine learning, and natural language processing. Useful machines for performing the various embodiments include general purpose digital computers or similar devices.

Any communication, transmission, communications channel, channel, and/or the like discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website, mobile application, or device (e.g., FACEBOOK®, YOUTUBE®, PANDORA®, APPLE TV®, MICROSOFT® XBOX®, ROKU®, AMAZON FIRE®, GOOGLE CHROMECAST™, SONY® PLAYSTATION®, NINTENDO® SWITCH®, etc.) a uniform resource locator ("URL"), a document (e.g., a MICROSOFT® Word™ or EXCEL®, an ADOBE® Portable Document Format (PDF) document, etc.), an "ebook," an "emagazine," an application or microapplication (as described herein), an SMS or other type of text message, an email, a FACEBOOK® message, a TWITTER® tweet, multimedia messaging services (MMS), and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network, and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, LINKEDIN®, INSTAGRAM®, PINTEREST®, TUMBLR®, REDDIT®, SNAPCHAT®, WHATSAPP®, FLICKR®, VK®, QZONE®, WECHAT®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

Further, illustrations of the process flows and the descriptions thereof may make reference to user WINDOWS® applications, webpages, websites, web forms, prompts, etc. Practitioners will appreciate that the illustrated steps described herein may comprise in any number of configurations including the use of WINDOWS® applications, webpages, web forms, popup WINDOWS® applications, prompts, and the like. It should be further appreciated that the multiple steps as illustrated and described may be combined into single webpages and/or WINDOWS® applications but have been expanded for the sake of simplicity. In other cases, steps illustrated and described as single process steps may be separated into multiple webpages and/or WINDOWS® applications but have been combined for simplicity.

In various embodiments, components, modules, and/or engines of system 100, or one or more subcomponents of system 100, may be implemented as micro-applications or micro-apps. Micro-apps are typically deployed in the context of a mobile operating system, including for example, a WINDOWS® mobile operating system, an ANDROID® operating system, an APPLE® iOS operating system, a BLACKBERRY® operating system, and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

In various embodiments, the system may implement middleware to provide software applications and services, and/or to bridge software components in the computer-based system, such as the operating system, database, applications, and the like. Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the internet server. Middleware may be configured to process transactions between the various components of an application server and any number of internal or external systems for any of the purposes disclosed herein. WEBSPHERE® MQ™ (formerly MQSeries) by IBM®, Inc. (Armonk, N.Y.) is an example of a commercially available middleware product. An Enterprise Service Bus ("ESB") application is another example of middleware.

The systems, computers, computer-based systems, and the like disclosed herein may provide a suitable website or other internet-based graphical user interface which is accessible by users. Practitioners will appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT® programs, active server pages (ASP), common gateway interface scripts (CGI), extensible markup language (XML), dynamic HTML, cascading style sheets (CSS), AJAX (Asynchronous JAVASCRIPT and XML) programs, helper applications, plug-ins, and the like. A server may include a web service that receives a request from a web server, the request including a URL and an IP address (192.168.1.1). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. As a further example, representational state transfer (REST), or RESTful, web services may provide one way of enabling interoperability between applications.

In various embodiments, one or more servers discussed herein may include application servers (e.g., WEBSPHERE®, WEBLOGIC®, JBOSS®, POSTGRES PLUS ADVANCED SERVER®, etc.). In various embodiments, the server may include web servers (e.g. Apache, IIS, GOOGLE® Web Server, SUN JAVA® System Web Server, JAVA® Virtual Machine running on LINUX® or WINDOWS® operating systems, etc.).

Users, systems, computer-based systems or the like may communicate with the server via a web client. The web client includes any device or software which communicates via any network such as, for example any device or software discussed herein. The web client may include internet browsing software installed within a computing unit or system to conduct online transactions and/or communications. These computing units or systems may take the form of a computer or set of computers, although other types of computing units or systems may be used, including personal computers, laptops, notebooks, tablets, smart phones, cellular phones, personal digital assistants, servers, pooled servers, mainframe computers, distributed computing clusters, kiosks, terminals, point of sale (POS) devices or terminals, televisions, or any other device capable of receiving data over a network. The web client may include an operating system (e.g., WINDOWS®, WINDOWS MOBILE® operating systems, UNIX® operating system, LINUX® operating systems, APPLE® OS® operating systems, etc.) as well as various conventional support software and drivers typically associated with computers. The web-client may also run MICROSOFT® INTERNET EXPLORER® software, MOZILLA® FIREFOX® software, GOOGLE® CHROME® software, APPLE® SAFARI® software, or any other of the myriad software packages available for browsing the internet.

As those skilled in the art will appreciate, the web client may or may not be in direct contact with the server (e.g., application server, web server, etc., as discussed herein). For example, the web client may access the services of the server through another server and/or hardware component, which may have a direct or indirect connection to an internet server. For example, the web client may communicate with the server via a load balancer. In various embodiments, web client access is through a network or the internet through a commercially-available web-browser software package. In that regard, the web client may be in a home or business environment with access to the network or the internet. The web client may implement security protocols such as Secure Sockets Layer (SSL) and Transport Layer Security (TLS). A web client may implement several application layer protocols including HTTP, HTTPS, FTP, and SFTP.

Any databases discussed herein may include relational, hierarchical, graphical, blockchain, object-oriented structure, and/or any other database configurations. In various embodiments, any database may also include a no-SQL database, a key-value database, an in-memory database, a GPU database, and/or the like. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2® by IBM® (Armonk, N.Y.), various database products available from ORACLE® Corporation (Redwood Shores, Calif.), MICROSOFT ACCESS® or MICROSOFT SQL SERVER® by MICROSOFT® Corporation (Redmond, Wash.), MYSQL® by MySQL AB (Uppsala, Sweden), MONGODB®, Redis, Apache Cassandra®, HBASE® by APACHE®, MapR-DB by the MAPR® corporation, or any other suitable database product. Moreover, any database may be organized in any suitable manner, for example, as data tables or lookup tables. Each record may be a single file, a series of files, a linked series of data fields, or any other data structure.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); data stored as Binary Large Object (BLOB); data stored as ungrouped data elements encoded using ISO/IEC 7816-6 data elements; data stored as ungrouped data elements encoded using ISO/IEC Abstract Syntax Notation (ASN.1) as in ISO/IEC 8824 and 8825; other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored, may be provided by a third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user, or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer, may be received by a standalone interaction device configured to add, delete, modify, or augment the data in accordance with the header or trailer. As such, in one embodiment, the header or trailer is not stored on the transaction device along with the associated issuer-owned data but instead the appropriate action may be taken by providing to the user at the standalone device, the appropriate option for the action to be taken. The system may contemplate a data storage arrangement wherein the header or trailer, or header or trailer history, of the data is stored on the system, device or transaction instrument in relation to the appropriate data.

One skilled in the art will also appreciate that, for security reasons, any databases, systems, devices, servers, or other components of the system may consist of any combination thereof at a single location or at multiple locations, wherein each database, system, device, server, and/or other component includes any of various suitable security features, such as firewalls, access codes, encryption, decryption, compression, decompression, and/or the like.

Encryption of data in system 100, including in one or more databases, may be performed by way of any of the techniques now available in the art or which may become available—e.g., Twofish, RSA, El Gamal, Schorr signature, DSA, PGP, PKI, GPG (GnuPG), HPE Format-Preserving Encryption (FPE), Voltage, Triple DES, Blowfish, AES, MD5, HMAC, IDEA, RC6, and symmetric and asymmetric cryptosystems. The systems and methods may also incorporate SHA series cryptographic methods, elliptic-curve cryptography (e.g., ECC, ECDH, ECDSA, etc.), and/or other post-quantum cryptography algorithms under development.

A firewall may include any hardware and/or software suitably configured to protect CMS components and/or enterprise computing resources from users of other networks. Further, the firewall may be configured to limit or restrict access to various systems and components behind the firewall for web clients connecting through a web server. The firewall may reside in varying configurations including Stateful Inspection, Proxy based, access control lists, and Packet Filtering among others. The firewall may be integrated within a web server or any other CMS components or may further reside as a separate entity. The firewall may implement network address translation ("NAT") and/or network address port translation ("NAPT"). The firewall may accommodate various tunneling protocols to facilitate secure communications, such as those used in virtual private networking. The firewall may implement a demilitarized zone ("DMZ") to facilitate communications with a public network such as the internet. The firewall may be integrated as software within an internet server, integrated into any other application server components, reside within another computing device, or take the form of a standalone hardware component.

The system and method may be described herein in terms of functional block components, screen shots, optional selections, and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT®, JAVASCRIPT® Object Notation (JSON), VBScript, Macromedia COLD FUSION, COBOL, MICROSOFT® company's Active Server Pages, assembly, PERL®, PHP, awk, PYTHON®, Visual Basic, SQL Stored Procedures, PL/SQL, any UNIX® shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT®, VBScript, or the like. Cryptography and network security methods are well known in the art, and are covered in many standard texts.

In various embodiments, the software elements of the system may also be implemented using a JAVASCRIPT® run-time environment configured to execute JAVASCRIPT® code outside of a web browser. For example, the software elements of the system may also be implemented using NODE.JS® components. NODE.JS® programs may implement several modules to handle various core functionalities. For example, a package management module, such as NPM®, may be implemented as an open source library to aid in organizing the installation and management of third-party NODE.JS® programs. NODE.JS® programs may also implement a process manager such as, for example, Parallel Multithreaded Machine ("PM2"); a resource and performance monitoring tool such as, for example, Node Application Metrics ("appmetrics"); a library module for building user interfaces, and/or any other suitable and/or desired module.

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet-based embodiment, an entirely hardware embodiment, or an embodiment combining aspects of the internet, software, and hardware. Furthermore, the system may take the form of a computer program product on a computer-readable storage medium having computer-readable program code means embodied in the storage medium. Any suitable computer-readable storage medium may be utilized, including hard disks, CD-ROM, SONY BLU-RAY DISC®, optical storage devices, magnetic storage devices, and/or the like.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Although the disclosure includes a method, it is contemplated that it may be embodied as computer program instructions on a tangible computer-readable carrier, such as a magnetic or optical memory or a magnetic or optical disk. All structural, mechanical, electrical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. § 112(f) unless the element is expressly recited using the phrase "means for" or "step for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:
    receiving, by a smart contract, a system coalition invocation from a first participant system, wherein the system coalition invocation comprises a first participant identifier associated with the first participant system and a software repository identifier;
    writing, by the smart contract, a system coalition to a distributed ledger, wherein the system coalition comprises the first participant identifier;
    transmitting, by the smart contract, the software repository identifier to a cloud provider;
    receiving, by the smart contract, a coalition generation response from the cloud provider, wherein the coalition generation response comprises data indicating that system software associated with the software repository identifier was successfully installed and executed on a cloud platform;
    receiving, by the smart contract, an API deployment request, wherein the API deployment request comprises an API repository identifier;
    transmitting, by the smart contract, the API repository identifier to the cloud provider, wherein the API repository identifier is associated with an API software for deploying an API, wherein the API provides the first participant system access to a cloud-based system in the cloud platform; and
    writing, by the smart contract, an API generation response to the distributed ledger, wherein the API generation response is received from the cloud provider in response to the API being deployed.

2. The method of claim 1, wherein the system coalition invocation comprises a second participant identifier.

3. The method of claim 2, further comprising:
    transmitting, by the smart contract, a pending coalition notification to a second participant system associated with the second participant identifier;
    receiving, by the smart contract, a pending coalition join request from the second participant system; and
    writing, by the smart contract, the pending coalition join request to the distributed ledger, wherein the software repository identifier is not transmitted to the cloud provider until the pending coalition join request is received, and wherein the system coalition comprises the second participant identifier.

4. The method of claim 1, wherein the API deployment request comprises a third participant identifier.

5. The method of claim 4, further comprising:
    transmitting, by the smart contract, a pending API deployment notification to a third participant system associated with the third participant identifier;

receiving, by the smart contract, an API deployment approval from the third participant system; and writing, by the smart contract, the API deployment approval to the distributed ledger, wherein the API repository identifier is not transmitted to the cloud provider until the API deployment approval is received.

6. The method of claim 1, wherein the first participant system invokes the API to transmit an API call to the cloud provider, wherein the API call comprises an API call functionality, and wherein in response to receiving the API call the cloud provider executes the API call functionality on the cloud-based system in the cloud platform.

7. The method of claim 6, further comprising:
receiving, by the smart contract, an API call event from the cloud provider, wherein the API call event is generated by the cloud provider in response to the cloud provider executing the API call functionality; and
writing, by the smart contract, the API call event to the distributed ledger.

8. A system comprising:
a processor; and
a tangible, non-transitory memory configured to communicate with the processor, the tangible, non-transitory memory having instructions stored thereon that, in response to execution by the processor, cause the processor to perform operations comprising:
receiving, by a smart contract, a system coalition invocation from a first participant system, wherein the system coalition invocation comprises a first participant identifier associated with the first participant system and a software repository identifier;
writing, by the smart contract, a system coalition to a distributed ledger, wherein the system coalition comprises the first participant identifier;
transmitting, by the smart contract, the software repository identifier to a cloud provider;
receiving, by the smart contract, a coalition generation response from the cloud provider, wherein the coalition generation response comprises data indicating that system software associated with the software repository identifier was successfully installed and executed on a cloud platform;
writing, by the smart contract, the coalition generation response to the distributed ledger;
receiving, by the smart contract, an API deployment request, wherein the API deployment request comprises an API repository identifier;
transmitting, by the smart contract, the API repository identifier to the cloud provider, wherein the cloud provider executes an API software to deploy an API, wherein the API provides the first participant system access to a cloud-based system in the cloud platform; and
writing, by the smart contract, an API generation response to the distributed ledger, wherein the API generation response is received from the cloud provider in response to the API being deployed.

9. The system of claim 8, wherein the system coalition invocation comprises a second participant identifier.

10. The system of claim 9, wherein the operations further comprise:
transmitting, by the smart contract, a pending coalition notification to a second participant system associated with the second participant identifier;
receiving, by the smart contract, a pending coalition join request from the second participant system; and writing, by the smart contract, the pending coalition join request to the distributed ledger, wherein the software repository identifier is not transmitted to the cloud provider until the pending coalition join request is received, and wherein the system coalition comprises the second participant identifier.

11. The system of claim 8, wherein the operations further comprise:
receiving, by the smart contract, an API deployment request, wherein the API deployment request comprises an API repository identifier;
transmitting, by the smart contract, the API repository identifier to the cloud provider, wherein in response to receiving the API repository identifier, the cloud provider retrieves an API software associated with the API repository identifier, wherein in response to retrieving the API software, the cloud provider executes the API software to deploy an API, and wherein the API provides the first participant system access to the cloud-based system in the cloud platform; and
writing, by the smart contract, an API generation response to the distributed ledger.

12. The system of claim 11, wherein the API generation response is received from the cloud provider in response to the API being deployed.

13. The system of claim 11, wherein the API deployment request comprises a third participant identifier.

14. The system of claim 13, wherein the operations further comprise:
transmitting, by the smart contract, a pending API deployment notification to a third participant system associated with the third participant identifier;
receiving, by the smart contract, an API deployment approval from the third participant system; and
writing, by the smart contract, the API deployment approval to the distributed ledger, wherein the API repository identifier is not transmitted to the cloud provider until the API deployment approval is received.

15. The system of claim 11, wherein the first participant system invokes the API to transmit an API call to the cloud provider, wherein the API call comprises an API call functionality, and wherein in response to receiving the API call the cloud provider executes the API call functionality on the cloud-based system in the cloud platform.

16. The system of claim 15, wherein the operations further comprise:
receiving, by the smart contract, an API call event from the cloud provider, wherein the API call event is generated by the cloud provider in response to the cloud provider executing the API call functionality; and
writing, by the smart contract, the API call event to the distributed ledger.

17. A method comprising:
receiving, by a cloud provider system, a coalition generation notification from a deployment smart contract on a distributed ledger, wherein the coalition generation notification comprises participant identifiers associated with a plurality of participant systems of a system coalition and a software repository identifier of system software that is to be deployed as part of the system coalition, wherein the participant identifiers comprises a first participant identifier associated with a first participant system;
retrieving, by the cloud provider system, the system software associated with the software repository identifier;

executing, by the cloud provider system, the system software to deploy a cloud-based system to a cloud platform;

invoking, by the cloud provider system, the deployment smart contract to write a system coalition generation response on the distributed ledger;

receiving, by the cloud provider system, an API repository identifier from the deployment smart contract;

retrieving, by the cloud provider system, an API software associated with the API repository identifier;

executing, by the cloud provider system, the API software to deploy an API, wherein the API provides the first participant system access to the cloud-based system in the cloud platform; and invoking, by the cloud provider system, the deployment smart contract to write an API generation response on the distributed ledger.

18. The method of claim 17, further comprising:

deploying, by the cloud provider system, the deployment smart contract on the distributed ledger; and invoking, by the cloud provider system, the deployment smart contract to register a participant account for the first participant system, wherein in response to being invoked the deployment smart contract generates the first participant identifier and writes the participant account to the distributed ledger.

19. The method of claim 17, further comprising:

receiving, by the cloud provider system, an API call from the API, wherein the API call comprises an API call functionality; and executing, by the cloud provider system, the API call functionality on the cloud-based system.

20. The method of claim 19, further comprising transmitting, by the cloud provider system, an API call result to the deployment smart contract, wherein in response to receiving the API call result the deployment smart contract writes the API call result to the distributed ledger.

* * * * *